(12) United States Patent
Henry-Labordere

(10) Patent No.: US 6,512,926 B1
(45) Date of Patent: Jan. 28, 2003

(54) DYNAMIC ROUTING SYSTEM FOR A SHORT MESSAGE SENT BY A CALLING PARTY USING A MOBILE PHONE

(75) Inventor: Arnaud Luglien Charles Jean Henry-Labordere, Paris (FR)

(73) Assignee: Nilcom, Paris (FR)

( * ) Notice: Subject to any disclaimer, the term of this patent is extended or adjusted under 35 U.S.C. 154(b) by 0 days.

(21) Appl. No.: 09/558,809

(22) Filed: Apr. 26, 2000

(51) Int. Cl.[7] .............................. H04L 12/413
(52) U.S. Cl. .................. 455/445; 455/466; 455/561
(58) Field of Search .............................. 455/445, 561, 455/466, 414, 560

(56) References Cited

U.S. PATENT DOCUMENTS

| | | | | |
|---|---|---|---|---|
| 5,153,902 A | * | 10/1992 | Buhl et al. ................. | 455/414 |
| 5,351,235 A | * | 9/1994 | Lahtinen .................... | 370/259 |
| 5,946,630 A | * | 8/1999 | Willars et al. ............. | 370/410 |
| 6,047,194 A | * | 4/2000 | Andersson ................. | 370/329 |
| 6,108,559 A | * | 8/2000 | Astrom et al. ............ | 455/466 |
| 6,208,870 B1 | * | 3/2001 | Lorello et al. ............. | 455/412 |

FOREIGN PATENT DOCUMENTS

WO   WO 98/56195   12/1998

OTHER PUBLICATIONS

Publication from IEEE Personal Communications Jun. 1997, pp. 15–23, article entitled Use of SS7 In D–AMPS–Based PCS: Orthodoxy Vs. Heterodoxy.
Copy of Search Report dated Jan. 24, 2000–France.

* cited by examiner

Primary Examiner—Thanh Cong Le
Assistant Examiner—Lana Le
(74) Attorney, Agent, or Firm—Baker & Daniels

(57) ABSTRACT

A system for a GSM mobile telephone belonging to the network of an operator of mobiles for an intended recipient of a short message (other network of mobiles). The short message (SMS) is composed of a routing envelope with a first field (number of, the calling mobile), ct second field (number of the first short message transmission centre (SMSC) of the network of the calling mobile), a third field (number of the called mobile), as well as a field reserved for the text of the message. A numbering plan (PN) contains the numbers of the short message transmission centres and the possible interconnections between the different transmission centres (SMSC) and the switching contains (MSC) of the networks of the called parties (M1a, ... M4a). A numbering plan manager (GPN) defines the relay transmission center or centres (SMSC) in order to reach the switching center (MSC) visited by the called party.

14 Claims, 10 Drawing Sheets

DYNAMIC ROUTING SYSTEM FOR A SHORT MESSAGE SENT BY A CALLING PARTY USING A MOBILE PHONE

PRIOR ART

Dynamic routing system for short messages (SMS) sent by a calling party using a mobile GSM telephone connected to the network of an operator of mobiles for an intended recipient of short messages (other GSM mobile subscribers or a pager) not belonging to the same mobile telephone network as the call party, nor necessarily to networks linked by roaming agreements or by interconnection agreements for the transmission of short messages (SMS).

the short message (SMS) being composed of a routing envelope with a first field (E1) containing the number of the calling party's mobile, a second field (E2) intended to receive the number of the first short message transmission centre (SMSC) of the network of the operator of the calling party's mobile, a third field (E3) containing the called mobile number, as well as a field reserved for the text of the message (TM), this system comprising short message transmission centres (SMSC) belonging to the same network or to a different network.

This is currently possible from a mobile (GSM or other) capable of comprising text messages (known as "short messages") and sending them to other mobiles (GSM, "pagers", etc.). And also from an INTERNET access.

The number of mobile or Internet access (IAP or ISP) network operators makes this ideal of interworking difficult, bearing in mind the technical constraints and the commercial restrictions due to competition.

Interest in such a service is increased if the users can send a message without themselves having to know all the agreements made by their GSM or Internet suppliers for sending messages to other networks.

Such a system which is known will first of all be described below with the aid of FIG. 1 which shows in a general manner the means which currently permit transmission of a short message and the structure of the actual short message.

In a second part, this prior art will be described in a more detailed manner with the terminology used in this field. Since this terminology is used solely and universally in its Anglo-Saxon form it has been necessary to use this terminology in the detailed description, and a glossary has been given at the end of the description in order to explain the different acronyms and abbreviations used in accordance with international GSM standards.

Figure 1:
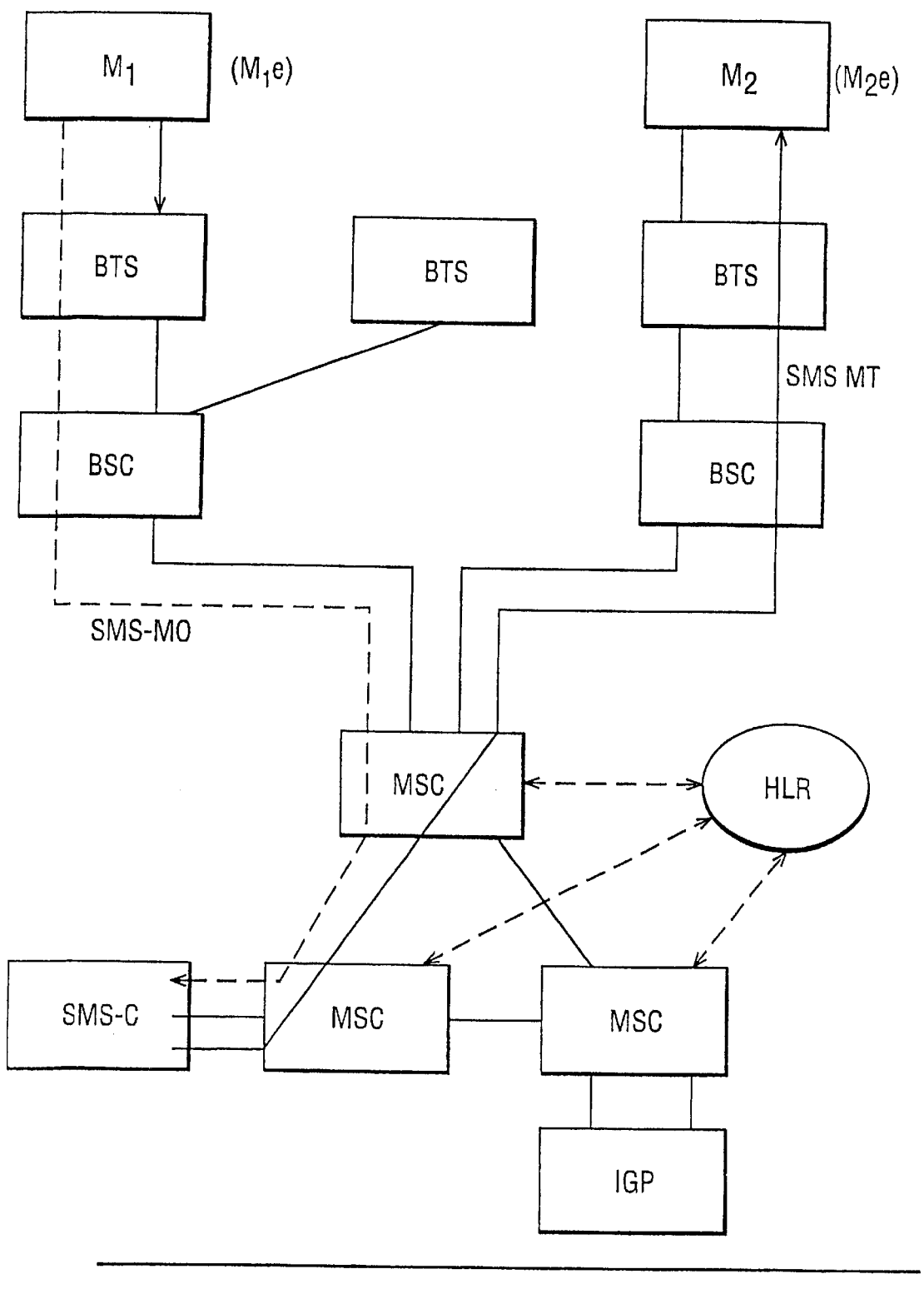

According to FIG. 1, a mobile telephone network (a mobile telephone is more simply called a "mobile") is composed of a base terminal station BTS with which the mobile M1 communicates. This terminal BTS as well as other terminals BTS are connected to a base station concentrator BSC. Several such concentrators BSC of one and the same network operator are connected to a mobile switching centre MSC.

When this centre MSC receives the request for connection of the mobile M1 to a called mobile M2 belonging to the same network, it can establish the communication to this mobile M2 via the same concentrator BSC or another base to the terminal BTS to which the mobile M2 belongs.

In the case of a mobile M3 which does not belong to the network, it is necessary for the centre MSC to use an international gateway with the other network in order to communicate.

The networks are represented in a simplified manner in FIG. 1.

The terminals BTS are distributed territorially in order to be connected to the mobiles of a certain geographical area. All these BTSs are connected to a concentrator BSC. There are several such concentrators BSC. These concentrators are themselves connected to a switching centre MSC.

When a request for a call for telephone communication is made by the mobile M1 to the destination of the mobile M2, the mobile M1 indicates solely the number of the mobile M2 to be reached. This request terminates at one of the centres MSC which in order to known the called M2 from its number must interrogate a database HLC which interprets the number of the called M2 and indicates, if it knows it, the centre MSC which must establish a connection passing via a concentrator BSC, then a terminal BTS.

The database IILR is the database of the subscriber's network containing its location (even on another network) and its profile.

When the connection is established, voice communication can be made between the mobiles M1 and M2.

In order to pass to another network, if M1 wishes to communicate with a mobile M3 belonging to another operator network, the centre MSC reaches the called M3 by passing via a gateway GMSC to the international telephone network.

The possibility of general voice communication of mobile telephones does not exist for transmission of short messages SMS (short message service) consisting of sending alphanumeric messages to a called party. This called party may be another mobile, of which the screen permits the message to be displayed in alphanumeric text. It may also be a pager, that is to say a portable terminal like a mobile but which can only receive written messages.

Currently for the short message service the network includes one or more short message service centres SMSC linked to a centre MSC. Since the short message service is not provided to all subscribers, this possibility of short messages which exists intrinsically on a mobile can only be used if the subscription provides for it.

The request for transmission and the effective transmission of short messages very generally make use of the network of the mobile telephone operator possibly with certain restrictions.

Thus in order to send a short message SMS, the calling mobile M1 sends its message SMS-MO which arrives at a centre MSC. This latter transmits it to the short message centre SMSC which examines the possibility or barring of transmission of the message. If the short message transmission service does not form part of the possibilities allowed on the mobile M1, the operation is blocked at this level. But if M1 is authorised to transmit short messages to other subscribers to the operator's network the centre SMSC gives this authorisation and the message is then routed towards the called party M2. The connection is established with a voice telephone communication. The centre SMSC is obliged to interrogate the database HLR via the centre MSC in order to know the path to the called M2.

If the network operator has an agreement with another network in the same country, and if the calling party M1 is authorised to benefit from this service, this possibility is confirmed by the centre SMSC; the centre MSC goes back to the database HLR of M2 in order to know the path to define to the addressee of the message belonging to another network which has a transmission agreement with the present network.

In a general way, the mobile telephone networks are national networks managed by a national operator. For international exchanges the operators have agreements with foreign operators who transmit the calls from a mobile in one country to a mobile abroad.

There are also possibilities for use of the mobile telephone for telephone communication from a foreign country, that is to say from a different network from the national network to which the mobile M1 subscribes. In this case, by virtue of usage (roaming) agreements the mobile M1 which is in a foreign country can access the local network and use the different terminals BTS, concentrators BSC and centres MSC of the country concerned in order to reach a called party in this country or in another country.

However, for different reasons such possibilities do not exist for the transmission of short messages or are not widespread for short messages or at least these possibilities are very limited.

There are also short message services which are strictly limited to a group of subscribers.

It should also be noted that the break in the path of a short message is situated at the level of the centre SSC. Between the mobile M1 and the centre SMSC the short message is entitled SMS-MO (short message sent from a "mobile") whilst downstream of the centre SMSC the message is entitled SMS-MT (a short message sent to a mobile from a service centre).

The transmission of the short messages SMS is explained with the aid of the extremely simplified diagram shown in FIG. 1.

When a calling party (subscriber to a mobile telephone network) wishes to send a short message with the aid of his mobile M1 (mobile functioning as sender of short messages) he keys in his alphanumeric message and the number of the addresses. This message SMS is sent currently to a short message centre SMSC belonging to the network of the operator to which the mobile M1 subscribes.

The number of the SMSC is set automatically in the mobile M1 without the user of the calling mobile having to intervene.

The centre SMSC accepts the transmission of this short message SMS if the called party (receiving mobile or called pager) belongs to the transmission network of the operator to which the mobile M1 subscribes. The transmission is then made by a transmission path which is not explained.

If the message SMS from the mobile M1 is intended for a called party belonging to the network of a different operator but one having an interworking agreement for short messages with the network of the operator of the mobile M1, the centre SMSC transmits the short message to the called party M3 via a SMS-MT by interrogating the HLR of the network of M3.

In order to permit their transmission, the short messages contain in their header a certain number of items of data concerning the routing and the addressee.

Figure 2:
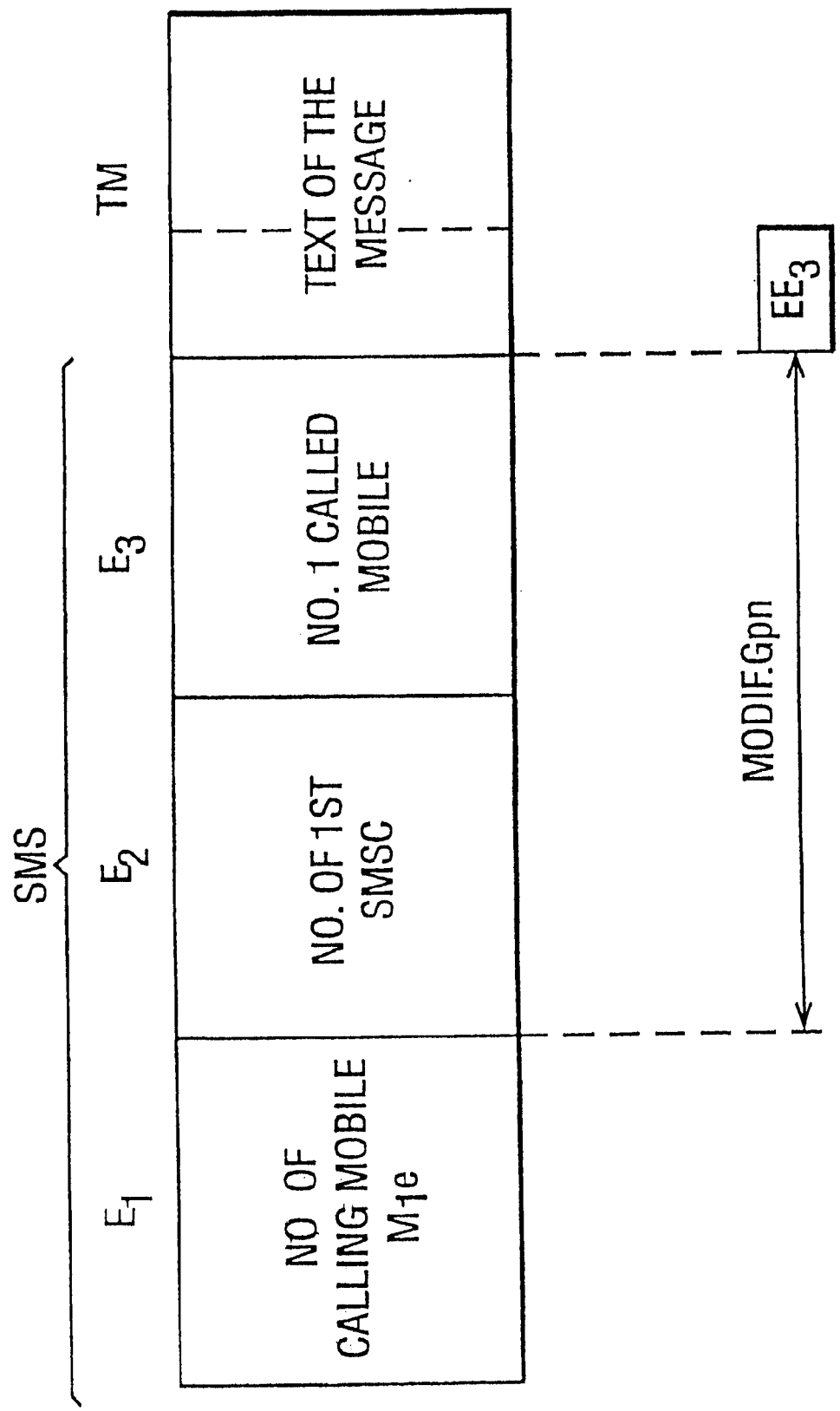

In a more precise manner the diagram of FIG. 2 shows the structure of a short message SMS. This message is composed of a routing envelope which constitutes the header of the message and a part reserved for the text of the message (alphanumeric symbols).

The routing envelope ER is composed of a first field E1 containing the number of the calling mobile (M1) (FIG. 2). A second field E2 of the routing envelope ER is reserved for the number of the short message SMS centre. The third field E3 of the envelope ER contains the number of the called party. Finally, the field TM is intended to receive the alphanumeric text of the short message. This field has a length of 160 characters.

Currently according to the prior art the field E1 contains the number of the calling mobile. This number is necessary for the management of the message (accounting) but also for the routing of the message and so that the intended recipient of the message knows the caller.

The second field E2 currently contains the number of the short message centre SMSC of the network to which the mobile M1 subscribes. The transmission of the message is carried out automatically without the message itself containing data concerning the management of this transmission, that is to say the succession of different centres of the operator's network through which the short message MSM transits.

Finally, the third field E3 contains the number of the mobile called.

A detailed description will be given below of the different known processes for transmission of sent messages and restrictions which mar such transmissions.

II—Reminder of the different current processes for restricting transmission of short messages from a GSM mobile to the mobile of another operator (case where there are roaming agreements)

The chain of transmission of a short message to its intended recipient is described below with the aid of FIG. 3, which shows two processes for restricting transmission of short messages:

A. The operator (HPLMN) where a mobile subscribes bars it from SMS-MO operation (prepay subscription for example).

Process for restriction at the level of the subscription

The VLR of the VPLMN$_c$ (visited network) contains a copy of its subscriber profile where the SMS-MO function is barred. In this case the network will return an error message to the subscriber. Naturally, the VPLMN$_c$ can be identical to the HPLMN if the mobile is not roaming. This process is very often implemented (for example for "prepay" subscriptions).

B. The Service Centre (RPLMN) refuses the SMS-MO.

The SMSC is operated by a third party (RPLMN) or by the subscription operator (HPLMN) without this changing anything apart from the administration of this refusal. The reason for this refusal may be not to load its SMSC for third party traffic. The fowardShortMessage contains the following address data of the MAP protocol (Messaging Application Protocol) contained in MAP-FORWARD-SHORT-MESSAGE address of the destination Service Centre the MSISDN (subscriber's number) of the calling mobile the MSISDN (subscriber's number) of the called mobile (in the field UI)

Process for restriction at the level of the called SMSC

The Service Centre may therefore refuse the deposit of a message:

for subscribers to all the calling networks (except its own)

for all except the subscribers of certain calling networks (a list of numbers must be created) (black list)

for none but the subscribers of certain networks (red list) (a list of numbers in E164 format (ITU standard as previously) must be created)

The called SMSC may be that of the subscription operator (home PLMN) or of a third-party operator (relay PLMN) which has an obligatory roaming agreement permitting an exchange of MAP messages between the networks.

This restriction process is more usual and easily implemented at the level of the SMSCs of the market which are configurable.

C. An international gateway (IGP) between the networks refuses the SMS-MO.

This may be the international gateway at the VLPMN, (transmitting) network end or at the RPLMN (receiving) network end, which will be systematically the case if there is no roaming agreement.

The restriction at the HPLMN$_d$ end (RPLMN=HPLMN$_d$) may be implemented by analysis of the Calling Party Address of the SCCP messages.

II—2—$2^{nd}$ stage: sending a SMS-MT from the Service Centre

It should be noted that the restriction processes below must however permit an SMSC to send SMS-MTs to its own subscribers even when they are roaming on another network.

It must also be possible:

to bar the other networks possibly from sending SMS-MTs to its own subscribers to allow the other networks to send MSM-MTs to their subscribers when they are roaming with the operator which has implemented the above restriction.

Example: the roamed SMSCs can send SMS-MTs to subscribers roaming on Chungwha Telecom (Taiwan) but not the Chungwha Telecom subscribers.

The MAP message Send Routing Info for Short Msg sent to the HLR contains:

the MSISDN (subscriber's number) of the called mobile the address of the originating Service Centre (RPLMN)

It does not contain the MSISDNs (subscriber number) of the calling mobile (if the SMS-MT follows a SMS-MO).

The HLR will return the subscriber's IMSI if it finds it, which will then be used for addressing the transmission of the short message.

II—2.1—Description of the mechanism for transmission of MAP messages from the RPLMN to the HPLMN The SMSC sends a MAP message "encapsulated" in a SCCP message.

Addressing of the SCCP message by the SMSC.

It is sent in a SCCP message containing:

"Called Party Address" in Q713 format

"Calling Party Address" in Q713 format, the address of the calling SMSC

Case 1

If the calling SMSC does not know (this necessitates creating a database with the addresses of the HLRs (address E164 or E214) all the HPLMN operators with which the RPLMN has roaming agreements it puts:

Calling Party Address=MSISDN of the subscriber who is the intended recipient of the SMS-MT for the "Global Title" field of this address.

Case 2

On the other hand if the calling SMSC has the numbering plan of the HPLMN it is capable of deducing (searching a table) from the MSISDN of the called subscriber the Global Title E164 or E214 of the HLR of this subscriber (there is roughly 1 IILR for 100 to 200,000 subscribers). In this case it puts in:

Called Party Address=address of the called HLR

It will be seen below that in this case for the (receiving) HPLMN this removes the possibility of restriction at the level of the receiving IGP.

Addressing of the MTP message to the transmitting IGP (of the RPLMN)

The SCCP message containing the MAP message must be sent by the SMSC to the transmitting IGP. For this the SMSC carries out an "address translation" (into "Semaphore Point") which will permit the RPLMN to carry out the routing of the message to the transmitting IGP, known this time, by a "Semaphore Point" address (ITU Q713 Standard).

The international network SS7 then transmits the message to the receiving IGP based on the "Called Party Address" of the SCCP message.

Routing effected by the receiving IGP (of the HPLMN)

This latter analyses the SCCP message (it does not process the MAP message contained) in order to effect the "address translation", that is to say to find the address of the "Semaphore Point" HLR to which to send it.

If the "Called Party Address" contains only the subscriber's number, this necessitates the IGP having a complete numbering plan of the HPLMN. If this plan is not installed, the message will be refused (passive process of restriction or rather "restriction by default").

On the other hand, (Case 2 above) if the SMSC has been capable of providing the address E164 or E214 of the HLR, the IGP will be obligatorily capable of making the address translation and will thus route the message to the IILR (on condition that there is a roaming agreement between RPLMN and HPLMN, if not the IGP rejects the message on the basis of the "Calling Party Address").

Explanation

In fact, if a subscriber of the HPLMN visits the RPLMN (while roaming) and is located, its VLR address (in E214 deduced from its IMSI in E212) must be transmitted at the time of the first switching on of its terminal at its HLR (so that it can receive calls) via the 2 IGP. The receiving IGP must therefore inevitably be capable of making the translation:

address E214 of the receiving LLR→semaphore point of (receiving) HLR.

Afterwards the networks dialogue with the addresses E164.

The HLR therefore responds to the VLR of the visited network by giving its address E164 (contained in a location updating MAP message).

The updates of locations made by the visited VLRs are made to the subscriber's HLR henceforth using this address E164.

This implies that the receiving IGP is also capable of making the translation.

Address E164 of the receiving HLR→(receiving) HLR semaphore point.

For reasons of symmetry in roaming, the transmitting IGP is also capable of making the translations of addresses E214 and E164 of its HLRs into semaphore point.

II—2.2 Processes of restriction

Figure 4:
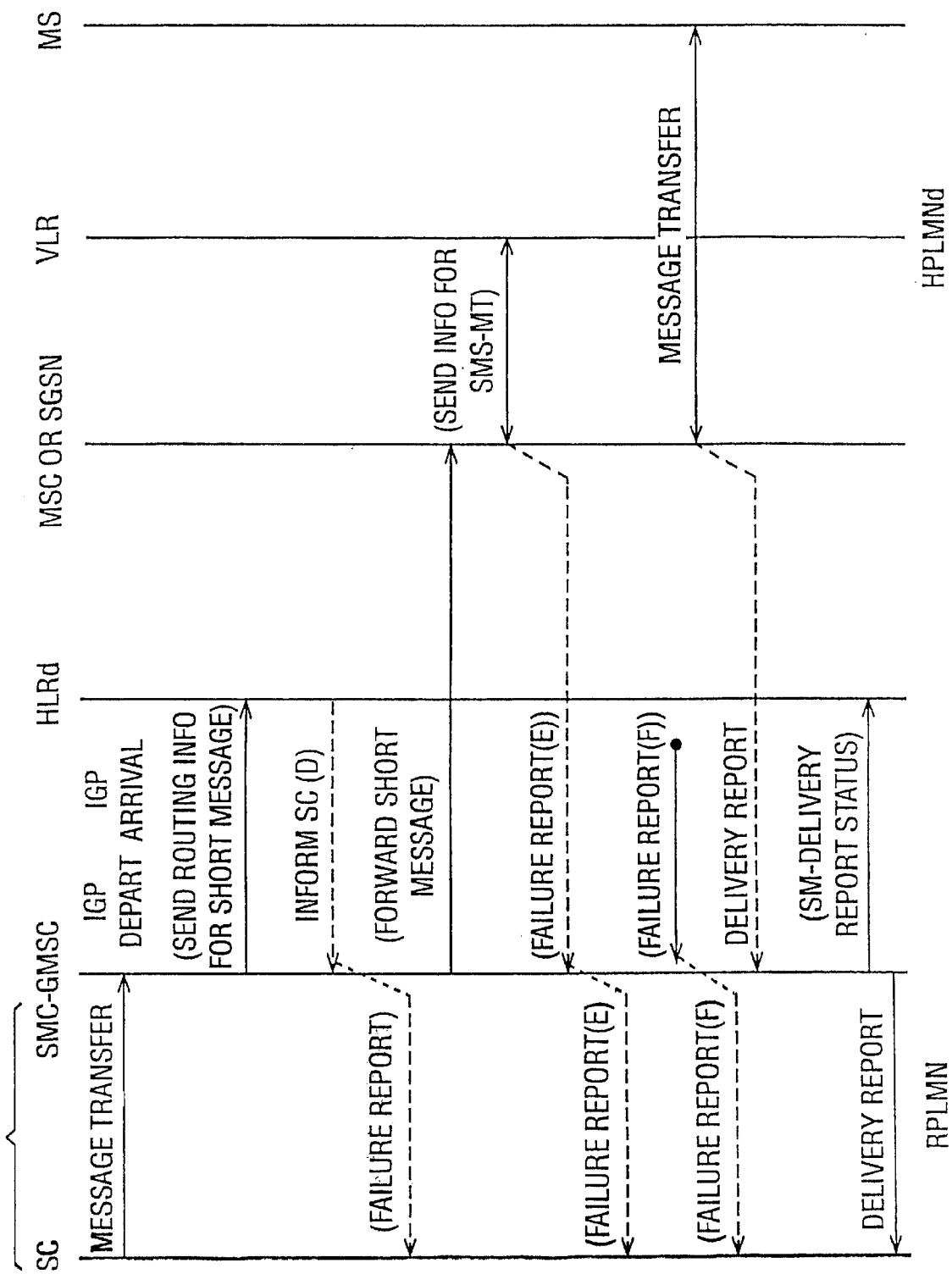

In FIG. 4 two processes can be seen for restriction of the reception by the IIPLMN of short messages (SMS-MT).

D. The HLR refuses to return the information requested by the Send Routing Info for Short Msg.

Process of restriction at the level of the HLR (HPLMN) of the called mobile

If the MSISDN belongs to the addressed network, the restrictions can be made exclusively on the address of the originating Service Centre (RPLMN).

The HLR can therefore refuse the interrogation:

for the SMSCs of all the calling networks (except its own)

for all except certain calling networks (black list)

for none except certain calling networks (red list)

Process of restriction

The HLR has available black/red lists permitting it to respond selectively to the requests for location information depending upon the originating SMSC. This functionality is progressively added to the latest versions of the HLR software but is not yet generalised.

E. The called MSC refuses the request to send the SMS-MT

As the MAP-FORWARD-SHORT-MESSAGE message contains the IMSI of the called mobile, it would be possible (with regard to the restrictions which might be made by the HLR) to add:

for no calling subscriber of certain networks (black list)

for no calling subscriber except those of certain networks (red list).

It is not possible for the receiving VLR to implement this restriction because the MSISDN information (subscriber numbers) of the calling mobile does not form part of MAP-SEND-INFO-FOR-MT-SMS.

Note that the MAP-FORWARD-SHORT-MESSAGE may contain an empty ("unknown") "calling subscriber" and thus that this use is not very flexible.

F. An international gateway (IGP) between the networks refuses the SMS-MT

This can be the international gateway at the RPLMN end or more usually of the $HPLMN_d$.

The refusal is made on the passage of a SCCP message encapsulating the MAP message "Send Routing Info for Short Msg" coming from the SMSC of a RPLMN. The analysis by the IGP is made solely on the addresses of the SCCP messages, as the IGPs do not have the function of analysing the content (MAP messages or others):

Calling Party Address and Called Party Address do not have a roaming agreement

The SMSC has sent its message (Case 1 above) with the MSISDN of the called subscriber as "Called Party Address" and the IGP has not implemented a numbering plan, the message is then refused ("restriction by default").

III—3—$3^{rd}$ stage: (possible) sending of a status report

Via his mobile the subscriber who sends a SMS-MO can ask to receive a confirmation when the SMS-MT has been correctly received by the called subscriber's mobile (technically a TP-SRR Status Report request bit is positioned in the message sent).

The process is identical, the roles being reversed with respect to the $2^{nd}$ stage: the SMSC RPLMN sends a message such as "message sent at 08:06:52. Received at 08:07:20" to the sender of the SMS by interrogating not the $HLR_d$ (of the intended recipient) but the $HLR_c$ of the sender.

For this (optional) function the SMSC must also have authorization to send a SMS-MT to the subscribers of the network "e".

The aim of the present invention is to develop a system of dynamic routing of short message SMS permitting such messages to be transmitted to called parties belonging to networks which cannot normally reach a calling mobile.

To this end the invention relates to a system of the type defined above which is characterised in that:

A) a numbering plan (PN) containing the numbers of the short message transmission centres (SMSC) and the possible interconnections between the different transmission centres (SMSC) and the switching centres (MSC) of the networks of the called mobiles (M1a, ... M4a), B) a numbering plan manager (GPN) which from then umber of the called party defines the relay transmission centre or centres (SMSC) in order to reach the switching centre (MSC) visited by the intended recipient of the short message (SMS).

IV—LIST OF FIGURES

Figure 3:
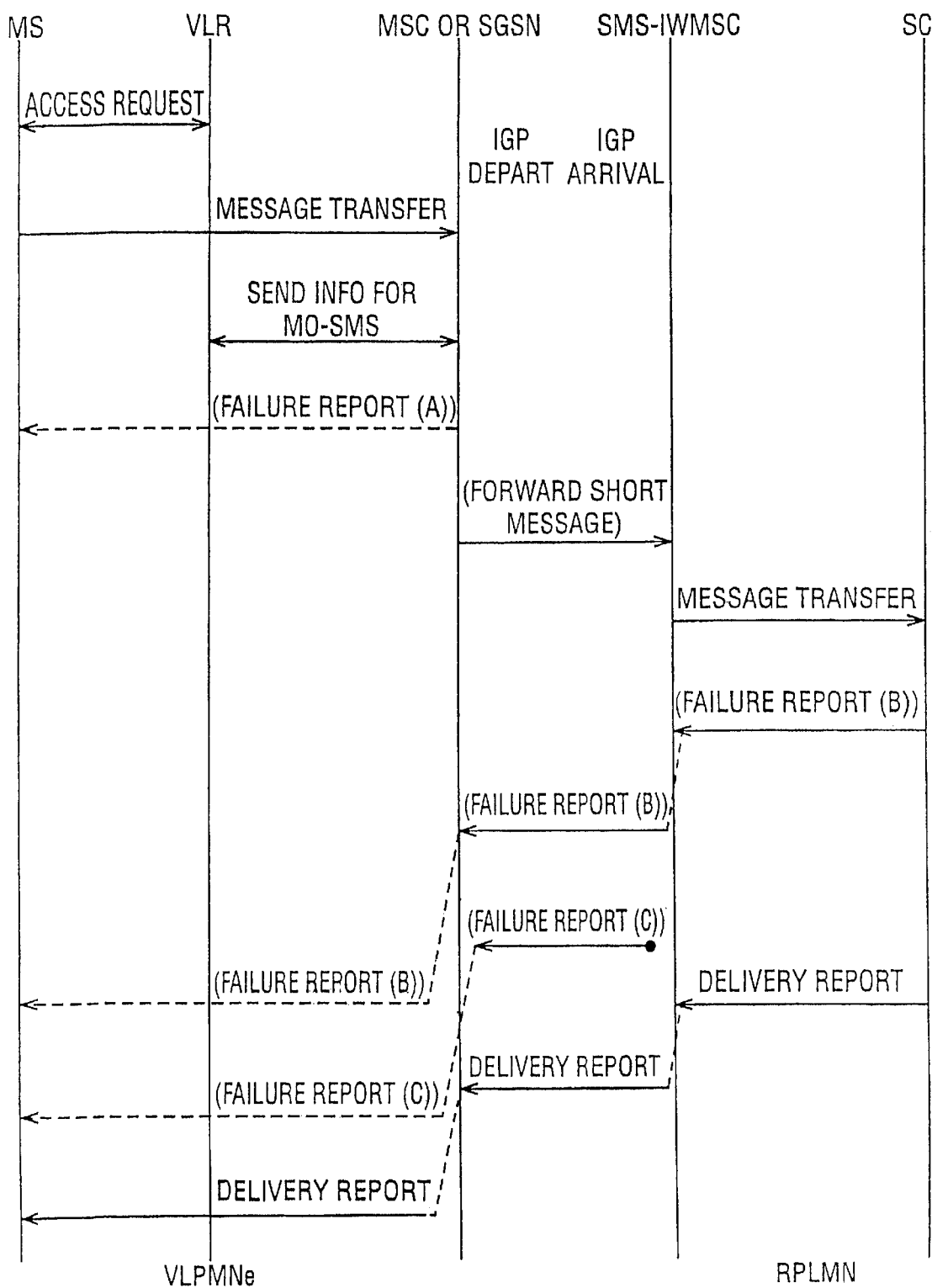
Figure 5:
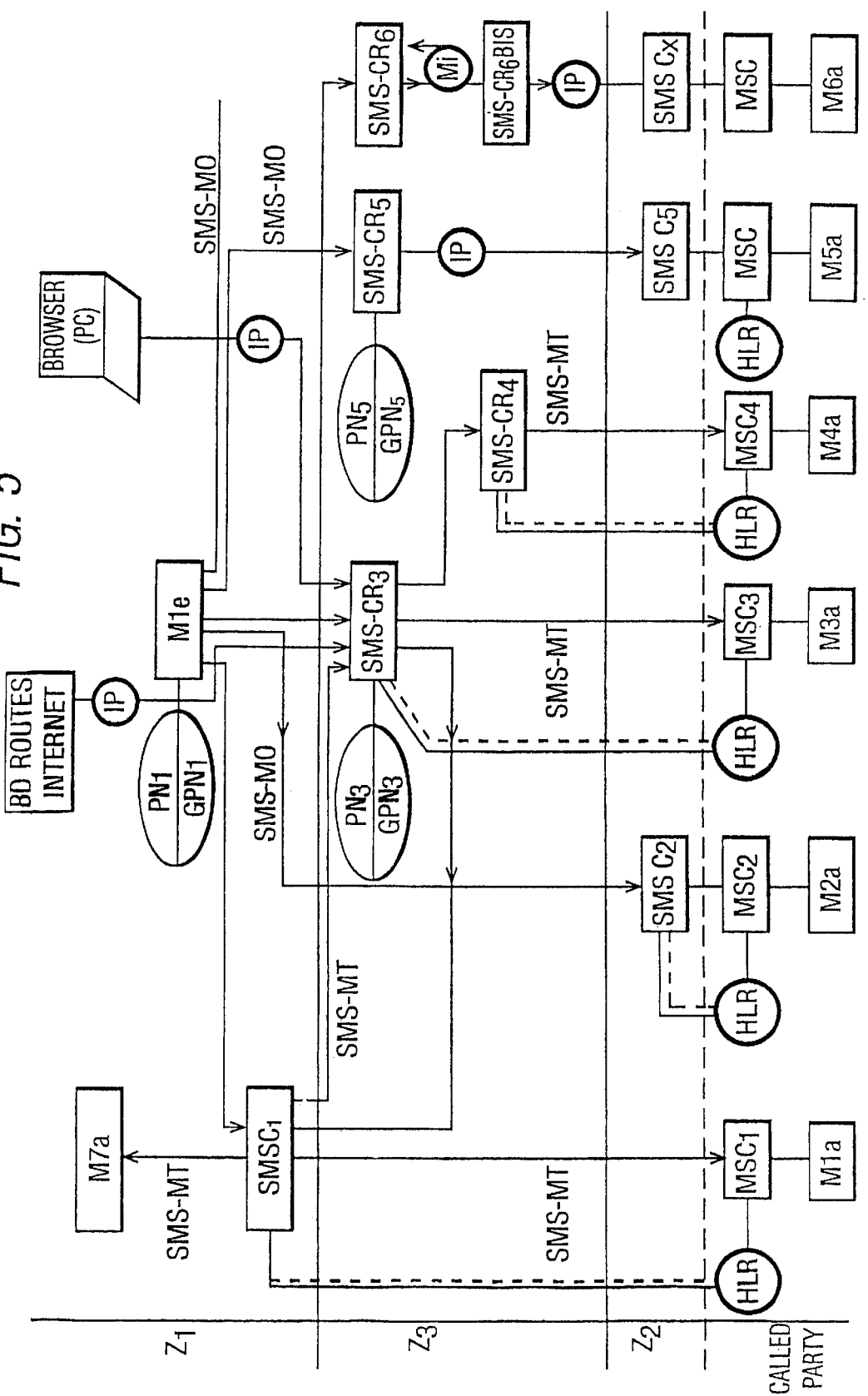
Figure 6:
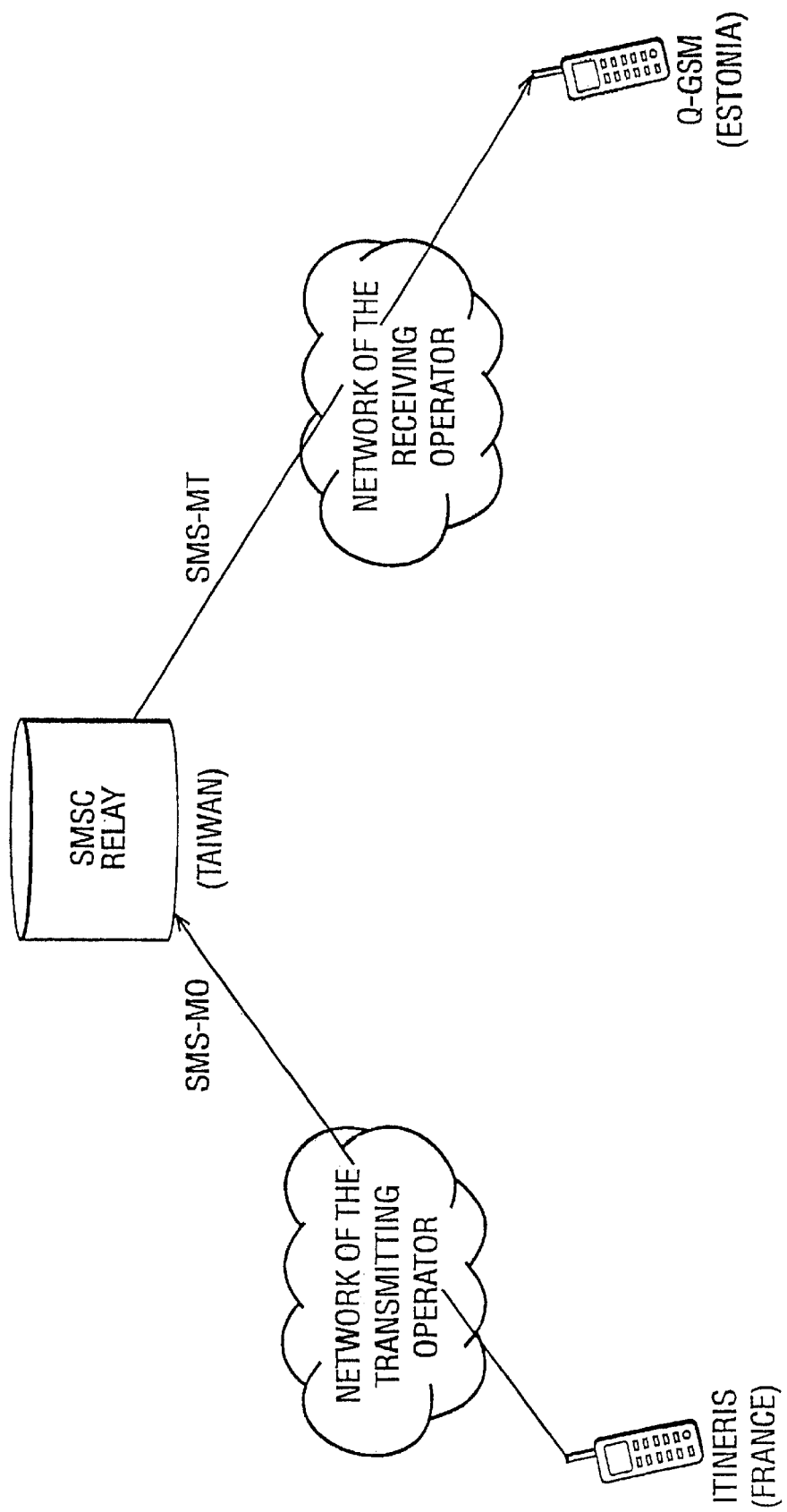
Figure 7:
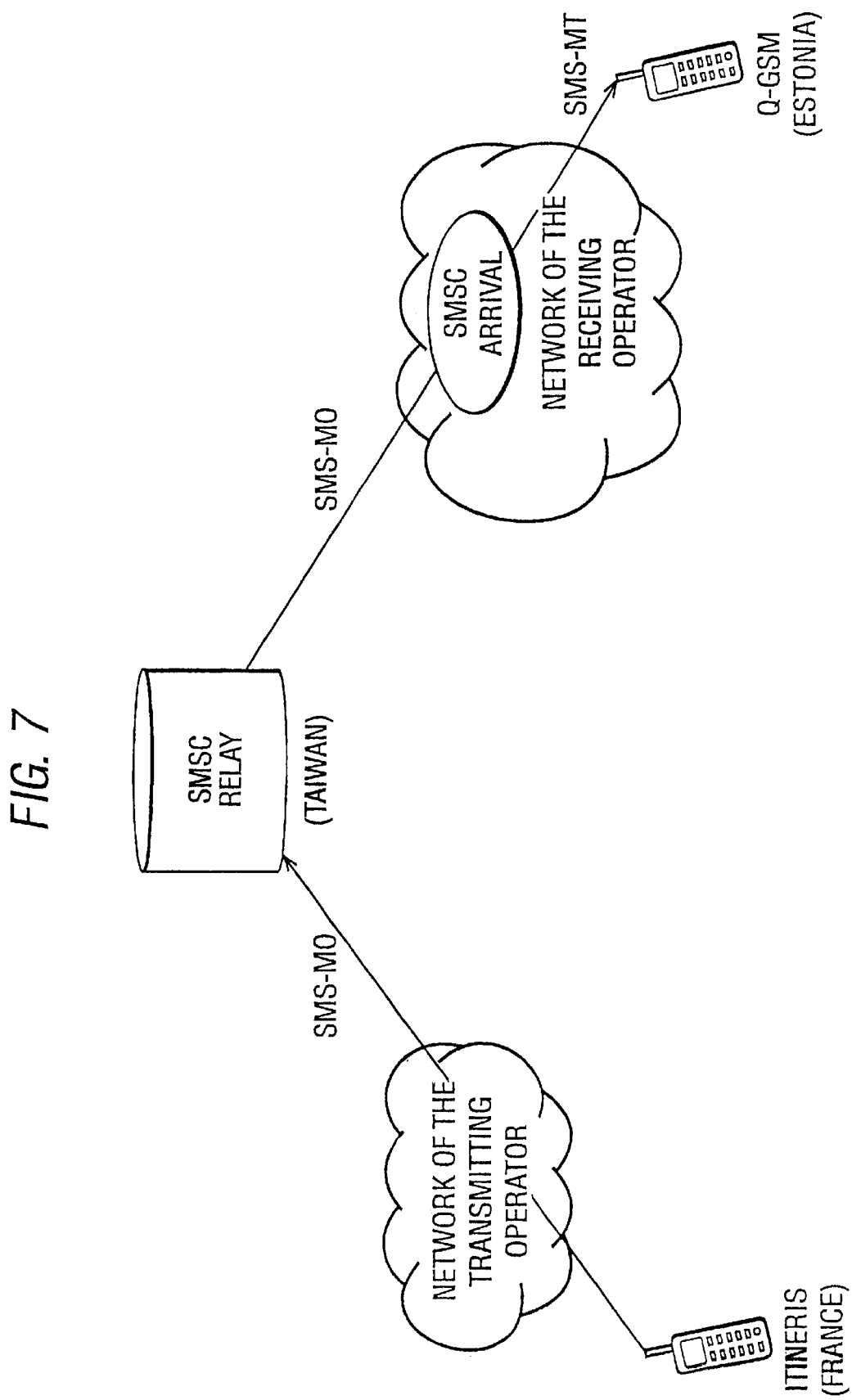
Figure 8:
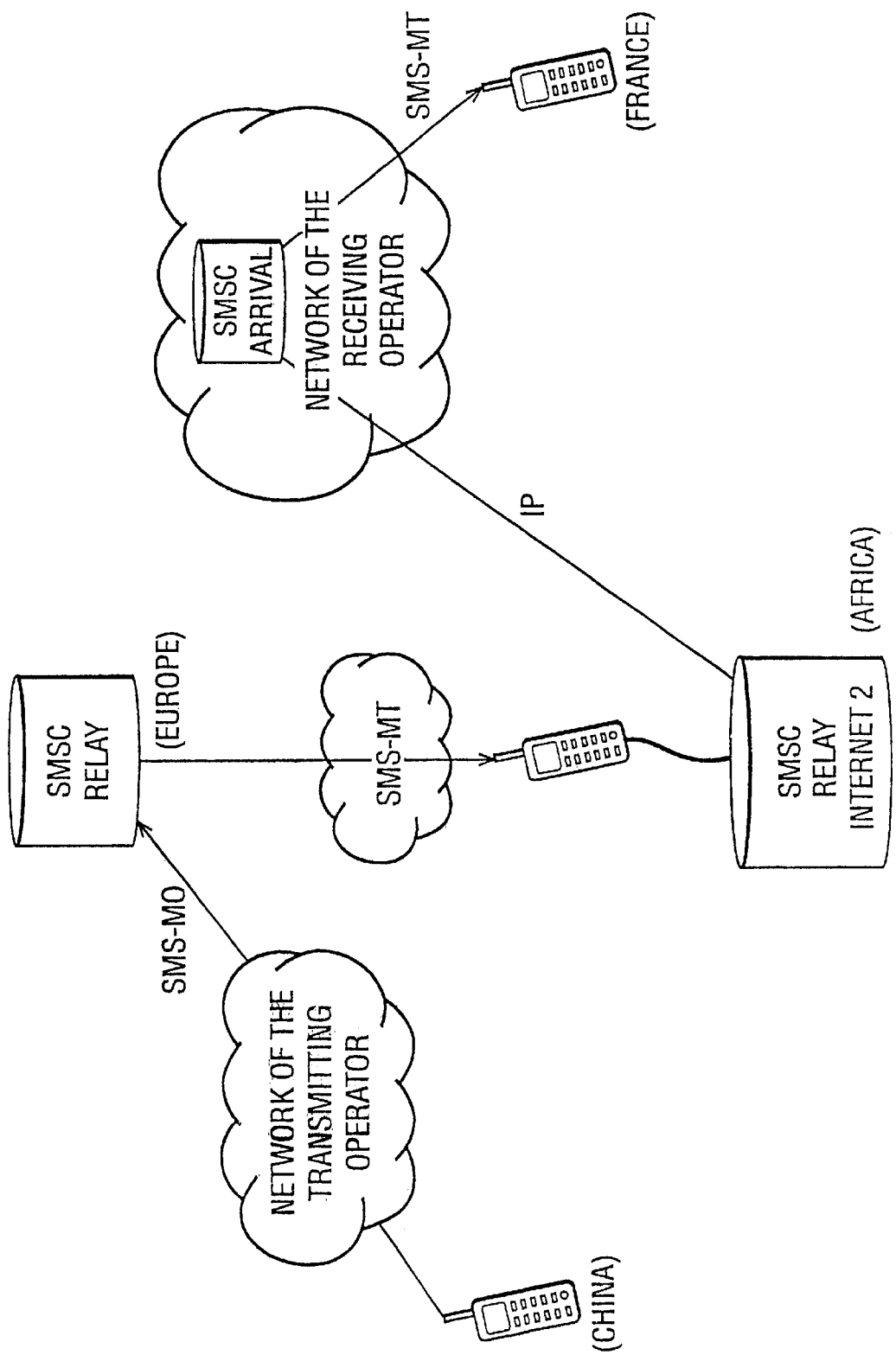
Figure 9:
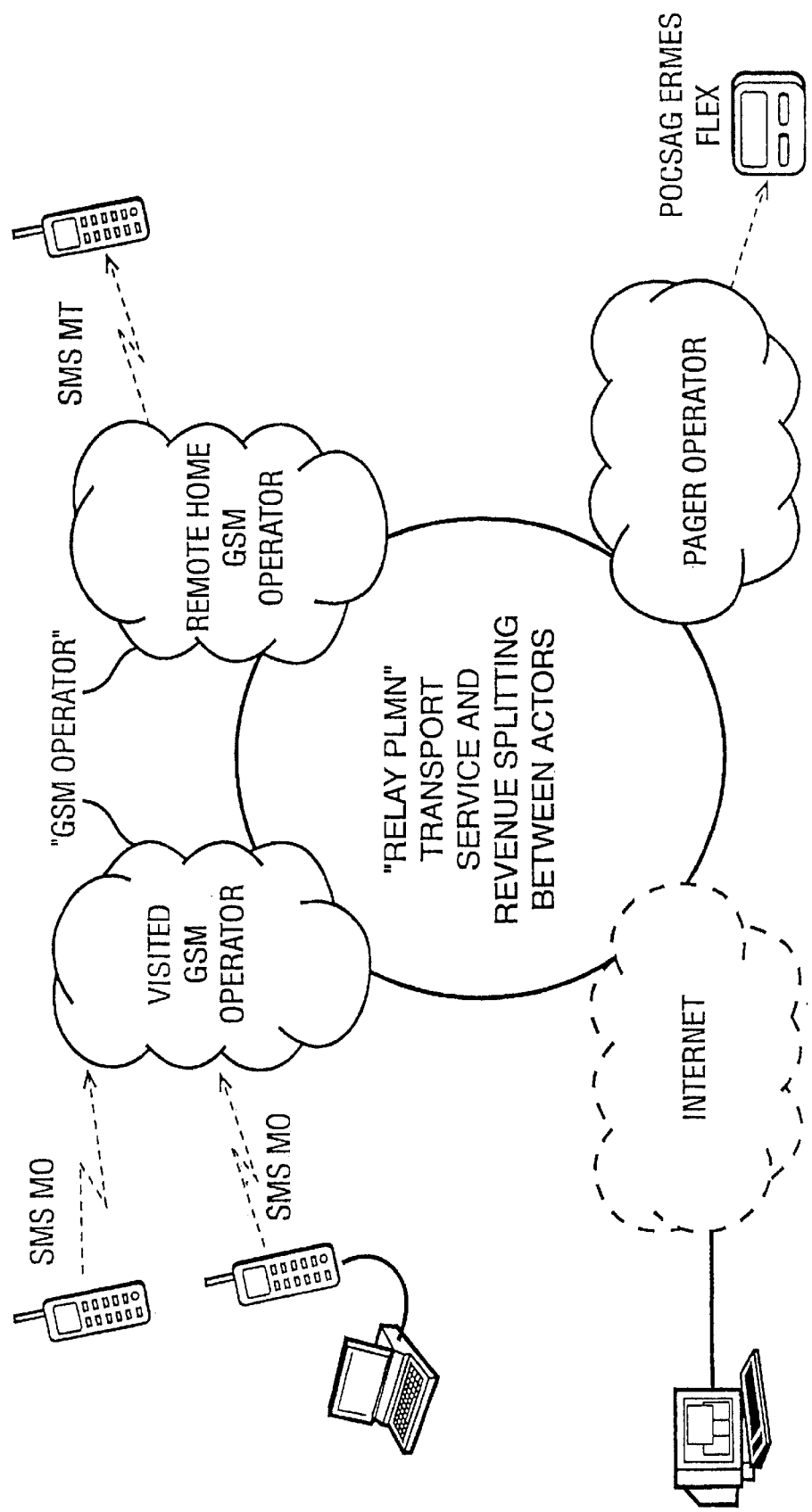
Figure 10:
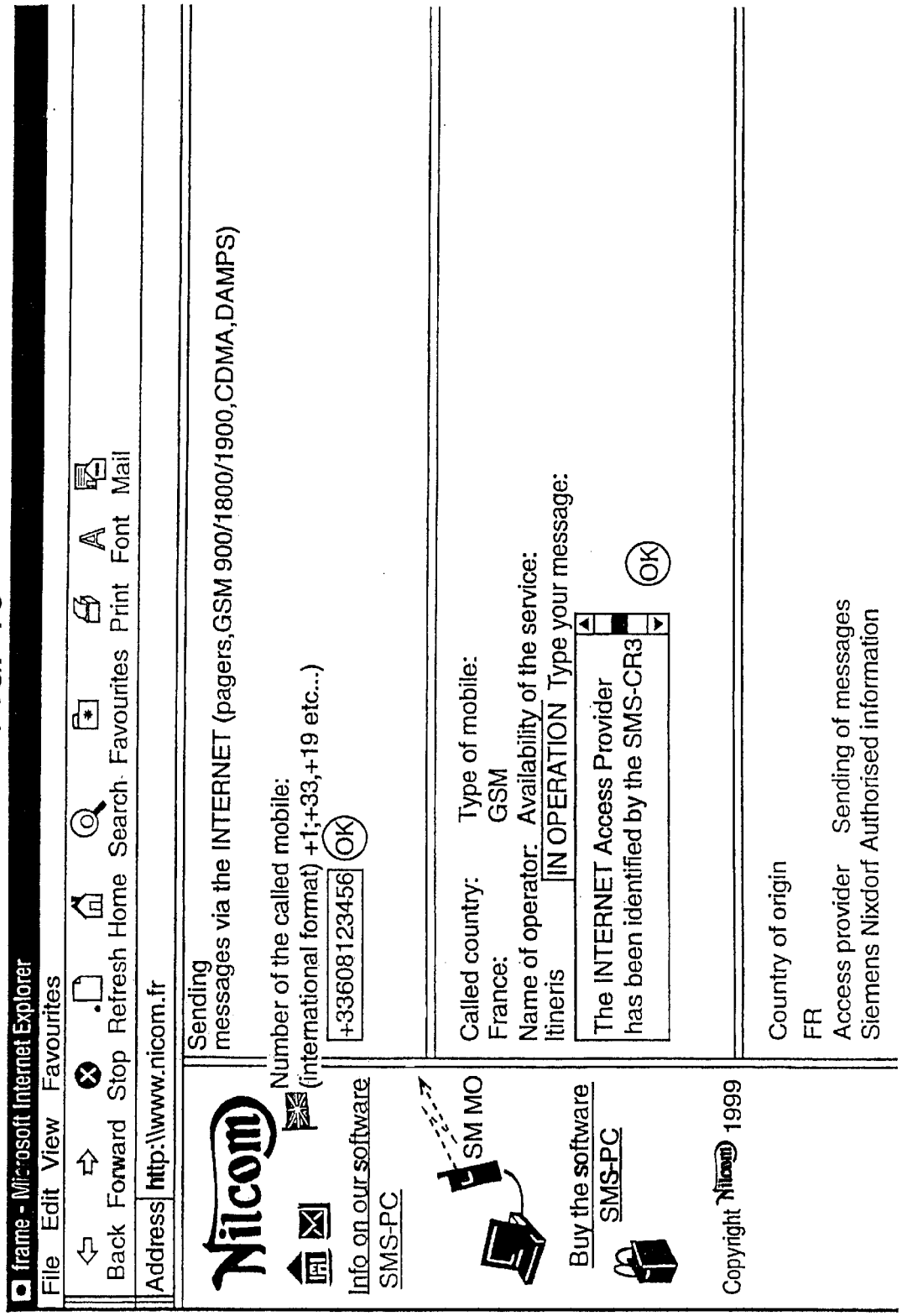

The present invention will be described below in greater detail with the aid of the accompanying drawings in which:

FIG. 1 is a diagram of a mobile telephone network,

FIG. 2 is a very diagrammatic presentation of the structure of a short message SMS, FIG. 3 presents two processes for restriction of sending short messages according to the prior art, FIG. 4 shows two processes for restriction of reception of short messages according to the prior art, FIG. 5 is a very simplified diagram of the system according to the invention, FIG. 6 shows a first process of dynamic routing with a SMSC centre in the chain of transmission, FIG. 7 shows a second process of dynamic routing with two SMSC centres in the chain of transmission, FIG. 8 shows a process of transmission with the relay SMSC centres, FIG. 9 is a routing diagram for a short message SMS via the Internet, FIG. 10 is the page for sending messages by the Internet with identification of the access provider.

V—DETAILED DESCRIPTION

The invention will be explained with the aid of FIG. 5 based on the structure of the short message MSM of FIG. 2.

According to FIG. 5, the invention relates to a system of transmission of short messages permitting a mobile M1e, belonging to the network of a certain operator working in a zone Z1, to transmit its short messages not only to a mobile M1a (receiving mobile) belonging to the network of the calling party's operator or to a mobile M2a belonging to an operator's network having an interworking agreement with the network of the operator of the calling party's mobile but also to the called parties M3a and M4a which belong to networks which do not have an interworking agreement with the operator of the mobile M1e or a called party M5a of a closed network which is reached via the Internet. The different called parties are set out by convention in the destination zone z2.

The called parties M1a, M2a, M3a, M4a, can be mobiles or pagers.

These different cases will be examined below.

The system for dynamic routing of short messages SMS according to the invention comprises a numbering plan PN and a numbering plan manager GPN.

The numbering plan contains, in part or in total, the numbers of short message transmission centres SMSC and the possible interconnections between the different transmission centres SMSC; the networks and the numbering plan manager GPN analyse the number of the calling party and define the relay transmission centre(s) in order to reach the transmission centre SMSC of the called party M1a, M2a, M3a, M4a, M5a of the short message SMS.

The transmission centres SMSC are the transmission centres of the different networks of existing mobile operators. This network is completed by special short message centres SMSC having interworking agreements with the different networks.

In order to explain the structure and the operation of the dynamic routing system according to the invention, FIG. 5 shows schematically the transmission of a short message from a mobile M1e to any called party M1a-M5a, that is to say belonging to any operator's network whatsoever by the different paths for routing of a short message to a called party from a calling mobile M1e. The first case is that of a called party M1a which belongs to a centre MSC1 having its database HLR. This centre belongs to a mobile telephone network with which the network of the calling mobile M1e has an interworking agreement. According to this agreement the centre SMSC1 to which the mobile M1e is addressed for sending a short message SMS (SMS-MO) interrogates the database HLR of the centre MSC1 to which the mobile M1a belongs. Then it transmits the message SMS-MT.

The second case is that of a distant centre SMSC2 which does not belong to the zone z1 but to the destination zone or zone z2 which, always by virtue of interworking agreements, accepts the messages from the operator to which the mobile M1e subscribes. In this case the mobile M1e sends its message SMS-MO directly to this centre SMSC2 which transmits it to the called party M2e via the centre MSC which can access a database HLR.

In a third case, in order to send a message to the mobile M3a the manager GPN1 of the mobile M1c with its numbering plan PN sends a message to a relay centre SMSC (SMSCR3) having a numbering plan PN2 and a plan manger GPN2. By virtue of interfunctionality agreements the relay centre SMSCR3 knows the address of the database HLR of the centre MSC3 to which the mobile M3a belongs. After having obtained the response of the database HLR, the centre SMSCR3 sends the short message, now of the SMS-MT type, to the centre MSC3 of the called party M3a.

Another case of transmission of a message to a called party M4a consists, in the present hypothesis for the mobile Me1 which has not numbering or program manager plan, of sending the message to a relay SMSC centre (of type SMSCR4) of which the user Me1 knows the number and to which it is authorised to transit. This centre SMSCR4 interrogates the database HLR of the centre MSC4 of the called party and transmits the message which it has received in its form SMS-MO (and not as a message which would be sent from a SMSC centre, i.e. in the from SMS-MT). By this transmission to SMSCR4 the centre SMSCR3 substitutes its number initially written into the field E2 of the messages SMS-MO which it has received from the mobile ME1 by the number in the field E2 of the centre SMS-CR4, the reason why the message transmitted by the centre SMS-CR3 to the centre SMS-CR4 is of the SMS-MO type.

The centre SMS-CR4 then transmits the message to the called party M4a as a usual SMSC centre would do.

Another possible case is that of a called party M5a for which the centre SMSC5 is not directly accessible but necessitates the passage through a relay centre SMSCR5 equipped with a numbering plan GPN5. The relay centre SMSCR5 is reached by the calling party M1e and it transmits the message to SMSC5 by a network of the Internet IP type.

Finally, in order to reach a called party M6a belonging to a network which is closed on itself, the mobile M1e sends a message to a relay centre SMSCR6 which transmits the message in SMS-MT form to an intermediate mobile Mi connected to a centre SMSC-R6bis, transmitting the message via the Internet (IP) to the centre SMSX of the closed network. This centre SMSX which receives an authorised SMS message then transmits it to the called party M5a In order to facilitate the presentation, the zones z1, z2 are separated by a zone z3 in which the different relay centres SMSCR appear.

Returning to FIG. 2, to summarise, the structure of the message SMS is if required modified according to the invention in the following manner.

the field E1 remains frozen until final use,
the field E2 is modified either by the calling mobile equipped with a plan PN and a plan manager GPN or by the PC to which it is linked and which contains the plan PN and the manager GPN.

The field E2 can also be modified by the special centre SMSC-R belonging to the system.

The expression "modified" here means that the field E2 is not necessarily and automatically the number of the centre SMSC1 to which the mobile M1c is linked because of its subscription to the network of the mobile telephone operator.

The field E3 is normally the number of the called mobile. However, this field can be replaced by the manager GPN1 either with the calling mobile M1e or by the that of a special relay centre SMSC-R (SMSCR3) and the number of the final destination displaced in the zone TM (EE3) reserved for the text of the message, in order to be interpreted later by a relay centre SMSCR4.

Generally a relay centre equipped with a numbering plan PN according to the invention has the possibility of routing either a message of SMS-MO type or of SMS-MT type which is sent:

directly to the mobile by knowing the address of the database HLR of the destination mobile from the numbering plan,
via the Internet by knowing the address of an Internet site permitting short messages to be sent to a called party.

The description of the dynamic routing system according to the invention will be illustrated below in greater detail with the aid of the description of the different chains of transmission based on FIG. 6.

The routing of messages via the Internet will be explained with the aid of FIG. 9.

VI—Dynamic routing processes
VI—1 Fixed routing

In the classical implementations, the mobile has registered (in the SIM card) the number of the Service Centre of its subscription operator, modification is possible but not convenient, all the more so since when a user wishes to send a short message to a subscriber of another network he does not know which network it is end, if he did know, what his correspondent's Service Centre number is.

The user can send a message via his local SMSC to the subscribers of networks for which his operator has implemented the SMS-MT service.

VI—2 Indirect dynamic routing

In the situation where there is no roaming agreement between the sending (e) and receiving (d) networks, a restriction of access on the destination network or an absence of SMSC on the latter, it is not possible to send a short message by direct dynamic routing (nor by fixed routing).

$1^{st}$ method (only 1 SMSC in the chain) (FIG. 6)

In the present invention the software (in the mobile or in the PC connected by cable) chooses "Service Centre" (called "relay") other than that of its (transmitting) subscription operator to that of the (receiving) operator of the destination subscriber. This "relay" Service Centre has been chosen because it accepts short messages coming from subscribers of the transmitting operator (not restriction B or C) and it has implemented the SMS-MT function to subscribers of the receiving operator (and the latter has not installed any restriction).

In the present invention, sending of a short message is therefore possible even though the transmitting and receiving operators do not have an interworking agreement for short messages.

by way of example the relay SC can be in another country than the transmitting and receiving operators, as illustrated in FIG. 6.

$2^{nd}$ method (2 SMSCs in the chain) (FIG. 7)

In the $1^{st}$ method the direct relay SMSC implements the SMS-MT function to the network of the receiving operator, which necessitates the creation of tables of addresses of the HLR or HLRs of the receiving operator and a numbering plan of the receiving operator making it possible to known the address of the HLR to be interrogated.

The $2^{nd}$ method according to the invention consists of programming the relay SMSC so that it sends a short message (SMS-MO) to the SMSC of the receiving operator. This is then sufficient to constitute the system for knowing the sole address of the receiving SMSC.

In particular if the intended recipient of the short messages belongs to the same network as the calling mobile, the messages will be re-routed to the SMSC of the (transmitting and receiving) operator which is common to both. This operator will inevitably accept the message because the address of the calling mobile belongs to its network (see FIG. 5, the case of SMS-CR3 re-routing to SMSC1). In this case, by programming a fixed address for the SMSC into their mobile (that of the relay SMSC instead of the SMSC of their network) the subscribers can send simultaneously to their network and to other networks.

The transmitting and receiving operators, if they are different, must have a roaming agreement with the relay SMSC but not necessarily with one another.

In order to facilitate sending by the relay SMSC (generally that of the linking operator), this latter can send the message to the following SMSC (SMS-CR3 in FIG. 5) by SMS-MT.

A relay centre SMS-CR3 behaves simultaneously as a classical SMSC (capable of receiving SMSMOs) and as an integrated HLR and MSC (capable of receiving SMS-MTs) of SMSC1; which permits the (SMSC1) of the linking operator simply to send SMS-MT messages, adding the address of the SMS-CR3 into its list of joinable HLRs.

In order to behave like an HLR with regard to (SMSCT) for all the called parties other than those of the network MSC1, the SMS-CR3 when it receives a request for location (SEND-ROUTING-INFO-FOR-MT) of the (SMSC1) returns the received MSISDN as IMSI and its own global title (GT) as MSC number which will make it (like an MSC) the called party of the SMS-MT which is going to be sent by (SMSC1).

The relay centre (SMS-CR3) can force the downstream relay centre (SMS-CR4) to accept its SMS-MO (even if they do not have an interconnection agreements for the transmission of short messages) by putting in the SMS-MO an originating mobile address as "unknown" or by putting the address of one of the subscribers of the SMS-CR4 (for example that of the called party itself).

A relay centre SMS-CR4 can on the other hand protect itself against the sending of SMS-MO by one or several unauthorised (SMS-CR3) by analysing the Global Title (GT) contained in the address of the calling (SMS-CR3) ("Calling Party Address") in Q713 format) which it receives obligatorily at the time of opening (reception of a MAP message of MAP-OPEN-IND or TCAP Begin type sent by SMS-CR3) by (SMS-CR3) of a transaction of sending SMS-MO.

It can then refuse this opening from a black list (the barred SMS-CR3s) which is easy to constitute or from a red list of the authorized SMSCs but which must also comprise all the MSCs of the operators with which it has roaming agreements in order to permit its subscribers to continue to send SMS-MOs from visited networks. This latter method permits it to bar a priori the sending of SMS-MO by SMS-CR3s but is complicated because ti is necessary to constitute a substantial list of MSCs which must be kept up to date.

$3^{rd}$ method (3 SMSC in the chain) (FIG. 8)

This permits an SMS to be sent to a subscriber of a "network closed to SMSs", for example by the method F (the receiving IGP does not effect the complete MSISDN translation), on condition that the SMSC of the receiving HPLMN has a means for sending SMS-MTs via the Internet.

The SMS-MO (coming from an operator in China) is sent to a relay 1 SMSC (in Europe) which sends it by SMS-MT over a GSM mobile connected to a "SMSC relay-Internet" 2 (in Africa) and transmits it (reception of SMS-MT) to this SMSC relay-Internet 2. This latter via the Internet sends the SMS to the SMSC of the receiving HPLMN which causes it to reach the called party by a SMS-MT (France).

Thus there are 2 SMS-MTs and 3 SMSCs in the chain, as illustrated by FIG. 8 below.

VI—3—Example of global arrangement (FIG. 9)

These different processes according to the invention make it possible to achieve a global system according to FIG. 9.

The GSM mobiles can send SMSs to other GSM mobiles or other (CDMA, DAMPS, etc.) (of other networks) or to pagers.

The Internet accessing can also obtain the same service;

VII—Implementing dynamic routing

VII—1—In a PC or a "Palm-Top" connected to the mobile

Software resulting from the invention, thanks to its world numbering plan, determines the receiving operator and as a function of the chosen routing (possibility, cost) determines the number of the relay SMSC and uses it to send the SMS. If there is not possible route, it displays this and blocks sending of the message.

The software in the PC (or the mobile, see VII.2) can display the list of joinable operators (Available Operators) from its dynamic routing file.

VII—2 In the mobile

This same logic can alternatively be implemented directly in the user's mobile.

VII—3 In a SMSC relay

There are two processes which exist so that a SMS arrives on the relay SMSC:

a) The user either manually or automatically for any message sent to a subscriber who is not on the same network changes the number of the Service Centre and puts that of the relay SMSC. This is easy if he has the software VII.1 or if this latter is implemented in his mobile as in VII.2.

b) The usual SMSC sends over the relay SMSC either by a SMS-MO function as described in the $2^{nd}$ method of VI.2 or by SMS-MT or by an INTERNET message, the relay SMSC also having an INTERNET access.

VIII—Routing of SMSs via the INTERNET

Numerous SMSCs offer the possibility of depositing messages via the INTERNET, then of sending them by SMS-MT.

In the present invention a relay SMSC can send SMSs via the INTERNET to a SMSC which has the above function. This is particularly useful if the destination SMSC does not have a roaming agreement with the SMS, since due to this process the sending of SMS is made possible.

Equally, according to the present invention, a relay SMSC can send messages via the INTERNET to pager operators, thus making possible the sending of SMS from a GSM to a pager terminal.

At the level of the SMSCs which implement this process the functionality of software used is that of "SMS to e-mail", since it is a question of sending a SMS to a subscriber of another network according to the present invention.

All of the processes and their implementation according to the present invention make it possible to achieve a network for sending short messages to GSM mobiles or "pagers".

In the present invention a relay SMSC can monitor the authorisations for sending messages coming from INTERNET users as a function of their INTERNET access provider.

A relay centre SMS-CR3 also behaves as an INTERNET server capable of receiving messages coming from an INTERNET browser and the characteristic IP address of the INTERNET access provider (LAP) (without the originator of the message himself being identified precisely), the access provider being identified precisely by the relay centre by interrogating one of the world databases (BD Routes INTERNET) for INTERNET routing (America, Europe, Asia-Pacific) with the IP address, obtaining in return the name of the INTERNET access provider. The relay centre SMS-CR3 can display a page giving the identification of the access network (FIG. 10) and can according to its authorization tables selectively accept or refuse the message coming from the INTERNET as a function of agreements made or not with the INTERNET access providers.

GLOSSARY

E164 Usual MSISDN address (Mobile Station ISDN Number) in CC form (Country code, France=+33) and Number in the country (NDC+SN)

E214 Address obtained from the E212 address (IMSI). The fields MCC (Mobile Country Code (France=208)) and MNC (Mobile Network Code (France Telecom=01)) are translated into CC+NDC, the field MSIN (National Mobile Subscriber Identity) characteristic of the subscriber remaining the same, the first 2 characters H1 H2 indicate the HLR of the subscriber.

GMSC Gateway MSC: MSC capable of directing a request for voice connection to the international telephone network and vice versa.

HLR Home Location Register, central database of the subscriber's network containing its location (even on another visited network) and its profile.

HPLMN Home Public Land Mobile Network, the PLMN of the subscriber's operator (where be subscribers).

IAP Internet Access Provider, for example in France: Wanadoo, CompuServe, AOL.

IGP International Gateway permitting a PLMN to be connected to the other networks for short message services. It effects routing of SCCP messages to national "Semaphore Point" systems due to its numbering plans which causes correspondence between MGT Address→Semaphore Point Address ISMSI International Mobile Subscriber Identity (in relation to the MSISDN and contained in the HLR and the SIM card of the subscriber in ITU E212 format, beginning with 208 for France.

ISP Internet Service Provider.

MAP Mobile Application Part (GSM standard 09.02).

MGT Mobile Global Title (international address of the systems in ITU E214 (ITU E212 in ANS1 standard) or in ITU E164.

MS Mobile Subscriber, the GSM terminal.

MTP3 Layer of protocol (ITU Q704) effecting the network layer for the transport of messages. The addressing is in the form of address of "Semaphore Point" (ITU Q713).

MSC or SGSN Mobile Switching Centre or Service GPRS Support Node, switching centre.

MSISDN Mobile Subscriber ISDN, RNIS subscriber number in the international format ITU E164 (for example beginning with 33 for France).

PAGER Unilateral radio-messaging terminal (example: Tatoo, Kobby in France).

PLMN Public Land Mobile Network, (fixed) transport network of the mobile operator.

RPLMN Relay Public Land Mobile Network, a PLMN which can receive SMS-MOs from a third party subscriber (roaming or not on another network). It can have RPLMN=HPLMN (the subscriber users the SMS of its subscription operator).

Q713 SCCP address containing 3 fields: Semaphore Point number, Sub-System Number, Global Title (GT) in E214 or E164 format.

Roaming Service permitting a subscriber of a network to telephone (make calls and receive them) from another network.

SC Service Centre, function of storing and managing repetitions of short messages.

SCCP Protocol layer effecting the routing of the messages with or without established connection, the addressing being in the form Q713 with a MGT (E164 or E214).

SMSC Short Message Service Centre, regroups SC+SMS-GMSC+SMS-IWMSG.

SMS-GMSC SMS Gateway MSC, function of interface with the MSC for connection SC, permitting the sending of SMS-MTs.

SMS9IWMS SMS Interworking MSC, function of interface with the MSC for connection SC, permitting the reception of SMS-MOs.

SMS-MO Short Message Service Mobile Originated, service for sending a short message from a "calling" mobile.

SMS-MT Short Message Service Mobile Terminated, service for sending a short message to a mobile from a Service Centre.

UI Unit Information, the useful information of the short message which contains the number of the calling mobile (SMS-MT) or called mobile (SMS-MO).

VLR Visited Location Register, local database of the visited network containing a copy of the subscriber profile transmitted by the HLR of the subscriber's network.

VPLMN Visited Public Land Mobile Network, the PLMN of the operator visited by a roaming subscriber. If a subscriber is not roaming VPLMN=HPLMN.

$_d$ Index for "called party".

$_c$ Index for "calling party" (for example $VPLMN_c$ is the VPLMN which the sender of a short message visits).

What is claimed is:

1. Dynamic routing system for short messages (SMS) sent by a calling party using a mobile GSM telephone connected to the network of an operator of mobiles for an intended recipient of short messages (other GSM mobile subscribers or a pager) not belonging to the same mobile telephone network, nor necessarily to networks linked by roaming agreements nor necessarily by interconnection agreements for the transmission of short messages (SMS), the short message (SMS) being composed of a routing envelope with a first field (E1) containing the number of the calling party's mobile, a second field (E2) intended to receive the number of the first short message transmission centre (SMSC) of the network of the operator of the calling party's mobile, a third field (E3) containing the called mobile number, as well as a field reserved for the text of the message (TM), the system comprising short message transmission centres (SMSC) belonging to the same network or to a different network, the system being characterised by:

A) a numbering plan (PN) containing the numbers of the short message transmission centres (SMSC) and the possible interconnections between the different transmission centres (SMSC) and the switching centres (MSC) of the networks of the called mobiles (M1a, . . . M4a), B) a numbering plan manager (GPN) which from the number of the called party defines the relay transmission centre or centres (SMSC) in order to reach the switching centre (MSC) visited by the intended recipient of the short message (SMS).

2. Routing system as claimed in claim 1, characterised in that the GPN checks the PN plan to ascertain if the linking operator is capable of sending the SMSs to the network of the final recipient, and in the affirmative it chooses the centre (SMSC1) of the linking operator.

3. Routing system as claimed in claim 2, characterised in that a relay centre SMS-CR3 behaves simultaneously as a classical SMSC (capable of receiving SMSMOs) and as an integrated HLR and MSC (capable of receiving SMS-MTs) of SMSC 1; which permits the (SMSC 1) of the linking operator simply to send (SMS-MT) messages, adding the address of the SMS-CR3 into its list of joinable HLRs.

4. Routing system as claimed in claim 3, characterised in that in order to behave like an HLR with regard to (SMSC1) for all the called parties other than those of the network SMSC1, the SMS-CR3 when it receives a request for location (SEND-ROUTING-INFO-FOR-MT) of the (SMSC 1) can return as IMSI the received MSISDN or another number with a table of correspondence and as MSC number its own global title (GT) (or another fixed one) which will make it (like an MSC) the called party of the SMS-MT which is going to be sent by (SMSC1).

5. Routing system as claimed in claim 3, characterised in that a relay centre SMS-CR3 also behaves as an INTERNET server capable of receiving messages coming from an INTERNET browser and the characteristic IP address of the INTERNET access provider (without the originator of the message himself being identified precisely), the access provider being identified precisely by the relay centre by interrogating one of the world databases (BD Routes INTERNET) for INTERNET routing (America, Europe, Asia-Pacific) with the IP address, obtaining in return the name of the INTERNET access provider.

6. Routing system as claimed in claim 5, characterised in that the relay centre SMS-CR3 can display a page giving the identification of the access network (FIG. 10) and can according to its authorisation tables selectively accept or refuse the message coming from the INTERNET as a function of agreements made or not with the INTERNET access providers.

7. Routing system as claimed in claim 1, characterised in that if the (SMSC) of the network of the called party (SMSC1) accepts the transmission of short mesages from the network of the caller (1e), this latter directly addresses the short message to the called party by SMS-MT.

8. Routing system as claimed in claim 1, characterised in that if the calling mobile and the called mobile belong to one and the same network, the relay centre (SMSCR3) forwards the message in the (SMSC) of the network by (SMS-MO).

9. Routing system as claimed in claim 1, characterised in that if a relay (SMSC) exists which is capable of sending short messages (SMS-MT) to the called mobile, the manager (GPN) chooses this centre (SMSCR3) having a numbering plan and numbering plan manager.

10. Routing system as claimed in claim 1, characterised in that it includes a relay (SMSC) centre with a numbering plan and a program manager which accesses another relay centre (SMSC) downstream by putting the number of the new (SMSC) in the field (E2) of the message, the downstream relay centre likewise having a numbering plan and a numbering plan manager, the relay centre (SMSCR3) sends the message (SMS-MO) to another relay centre (SMSCR4) likewise equipped with a numbering plan (PN4) and a manager (GPN4) which addresses the message to the network of the called mobile.

11. Routing system as claimed in claim 10, characterised in that the relay centre (SMS-CR3) can force the downstream relay centre (SMS-CR4) to accept its SMS-MO (even if they do not have an interconnection agreement for the transmission of short messages) by putting in the field SM-RP-OA (GSM standard 09.02) of the SMS-MO either an originating mobile address as "unknown" or by putting the address of one of the subscribers of the SMS-CR4, for example that of the called party itself.

12. Routing system as claimed in claim 11, characterised in that a relay centre (SMS-CR4 can protect itself against the sending of SMS-MO by one or several unauthorised (SMS-CR3) by analysing the Global Title (GT) contained in the address of the calling (SMS-CR3) ("Calling Party Address" in Q713 format) which it receives obligatorily at the times of opening (reception of a MAP message of MAP-OPEN-IND or TCAP Begin type sent by SMS-CR3) by (SMS-CR3) of a transaction of sending SMS-MO. It can then refuse this opening from a black list (the barred SMS-CR3s) which is easy to constitute or from a red list of the authorised SMSCs but which must also comprise all the MSCs of the operators with which it has roaming agreements in order to permit its subscribers to continue to send SMS-MOs from visited networks.

13. Routing system as claimed in claim 1, characterised in that the relay centre (SMSCR5) sends the message via the Internet to the (SMSC) of the network of the called party.

14. Routing system as claimed in claim 1, characterised in that the relay centre (SMSCR6) sends the message to the intermediate mobile (MI) belonging to a network permitting a message to be deposited in the (SMSC) of the called party via the Internet.

* * * * *

UNITED STATES PATENT AND TRADEMARK OFFICE
CERTIFICATE OF CORRECTION

PATENT NO.    : 6,512,926 B1                                               Page 1 of 1
DATED         : January 28, 2003
INVENTOR(S)   : Arnaud Luglien Charles Jean Henry-Labordere It is certified that error appears in the above-identified patent and that said Letters Patent is hereby corrected as shown below:

<u>Title page,</u>
Please add the following under item [30]

-- [30] Foreign Application Priority Data
June 3, 1999     (FR)     99 06 989
April 26, 1999   (FR)     99 05 239 --

Signed and Sealed this

Tenth Day of June, 2003

JAMES E. ROGAN
*Director of the United States Patent and Trademark Office*